(12) United States Patent
Schork et al.

(10) Patent No.: US 6,369,135 B1
(45) Date of Patent: Apr. 9, 2002

(54) WATER-BORNE ALKYD COATINGS BY MINIEMULSION POLYMERIZATION

(75) Inventors: F. Joseph Schork; Jan W. Gooch; Gary W. Poehlein; Shou-Ting Wang, all of Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 08/696,361

(22) Filed: Aug. 13, 1996

Related U.S. Application Data

(60) Provisional application No. 60/002,367, filed on Aug. 15, 1995.

(51) Int. Cl.[7] .............................. C08F 2/16; C08K 3/26
(52) U.S. Cl. ....................... 523/500; 523/201; 524/458; 524/457; 524/459; 524/513
(58) Field of Search ................................. 523/500, 201; 524/458, 457, 459, 513

(56) References Cited

U.S. PATENT DOCUMENTS

| | | | |
|---|---|---|---|
| 3,620,989 A | | 11/1971 | Cummings |
| 5,071,904 A | | 12/1991 | Martin et al. |
| 5,686,518 A | * | 11/1997 | Fontenot et al. ............ 524/458 |
| 5,686,578 A | * | 11/1997 | Fontenot et al. ............ 524/458 |
| 5,721,294 A | * | 2/1998 | Buter et al. ................ 523/201 |
| 5,786,420 A | * | 7/1998 | Grandhee ..................... 525/7 |
| 5,969,030 A | * | 10/1999 | Grandhee ................... 524/457 |
| 6,001,915 A | * | 12/1999 | Schwarte et al. ........... 524/457 |

* cited by examiner

Primary Examiner—Diana Dudash
Assistant Examiner—Mina Haghighation
(74) Attorney, Agent, or Firm—Hahn Loeser & Parks LLP

(57) ABSTRACT

A distinctive graft copolymer is made by dissolving an alkyd resin in various vinyl monomers (methyl methacrylate, styrene, etc.). The monomer/alkyd solution is then miniemulsion polymerized to form a latex consisting of submicron particles of polymer with the alkyd grafted onto the polymer backbone. The latex can be applied to a substrate, which on drying forms a polymeric film with good film properties. The latex can be used in a latex paint formulation in place of an acrylate, acetate or styrene-divinyl benzene latex. In this way it is possible to produce water-borne alkyd coatings which combine the film hardness properties of an oil-based alkyd coating with easy application and cleanup. The coating will beneficially lack organic solvent exposure of typical standard latex coatings.

36 Claims, 5 Drawing Sheets

- ● - MA100 (60°C)
- ■ - MA100 (60°C)
- ▲ - MA00 (60°C)
- + - MA100 (80°C)

WATER-BORNE ALKYD COATINGS BY MINIEMULSION POLYMERIZATION

This application claims priority to provisional application 60/002,367 filed Aug. 15, 1995.

TECHNICAL FIELD

The invention described herein pertains generally to miniemulsion polymerization processes in which an alkyd resin is dissolved in a vinyl monomer or monomer mixture which is then dispersed under high shear conditions, in the presence of at least one surfactant and optionally, a cosurfactant, into an emulsion of submicron droplets. The emulsion is polymerized by a free radical mechanism under conditions which favor nucleation of the monomer droplets. The resultant submicron polymer particles contain polymer with alkyd resin grafted to the backbone polymer.

BACKGROUND OF THE INVENTION

Water-based coatings, and polymer latexes in particular, have become more widely used in the past several decades because they are environmentally friendly, offer easier clean up, and offer improved performance characteristics. However, in spite of these advantages, solvent based systems such as alkyd resins have remained important for some applications because of superior properties such as gloss and hardness.

Emulsion polymerization is a widely used technique which has been extensively described in literature, both patent and non-patent. Production of synthetic latexes via emulsion polymerization is well-known. Among the polymers commonly produced by emulsion polymerization are styrene-butadiene copolymers, acrylic polymers and copolymers, and polyvinyl acetate. Polymers prepared by emulsion polymerization are widely used as binders in water-based latex paints for both interior and exterior use. Emulsion polymerization is also used to prepare polymer foams and polymers used as coatings.

Emulsion polymerization requires the following key ingredients: water, a monomer or mixture thereof, a surfactant or mixture thereof, and a polymerization initiator. The monomer or mixture thereof is typically dispersed into droplets and polymer particles are formed during the polymerization with the aid of a surfactant or mixture thereof with the aid of an agitator. Monomer droplet diameters are typically from 1 to 10 microns.

Emulsion and miniemulsion polymerizations have many similarities but the particle nucleation and reagent transplant phenomena are very different. Conventional emulsion polymerization starts with a monomer emulsion comprised of relatively large (in the range of 1 to 10 microns) monomer droplets and significant free or micellar emulsifier. Particle nucleation takes place early in the reaction via homogeneous (water phase) reactions or via free radical entry into monomer-swollen micelles. Radicals can enter the monomer droplets but this phenomenon is generally discounted because of the relatively small droplet surface area. Nucleation stops or slows significantly after the surface area of the particles becomes sufficient to adsorb all of the emulsifier. The major locus of polymerization thereafter is in the nucleated particles. The reagents (monomer, chain transfer agents, etc.) must move from the monomer droplets to the reaction sites in the particles.

Miniemulsion polymerization, by contrast, begins with submicron droplets which are able to accommodate most of the added emulsifier. High intensity fluid deformation and a cosurfactant are employed to generate and stabilize the small droplet size miniemulsion. Particle nucleation is primarily via droplet penetration and, if most droplets are nucleated, the reagents are located at the polymerization sites and mass transport, except for the radicals, is not involved. Either water-soluble or oil-soluble initiators can be employed in miniemulsion polymerization.

Monomer droplet size instability is observed in monomer emulsions. The smaller monomer droplets will disappear by two mechanisms. The first is flocculation into larger droplets. This can be effectively prevented by providing an adequate layer of surfactant at the droplet surface. The second is Ostwald ripening. This phenomenon consists of the diffusion of monomer out of the smaller droplets and into the larger ones; the polymer does not so diffuse. The net effect is a reduction in interfacial surface area, and hence, of surface free energy. In an unpolymerized conventional emulsion (which will be called herein a "macroemulsion"), the disappearance of the small droplets takes place in seconds. This precludes the nucleation of these droplets into polymer particles. In a miniemulsion, a combination of high shear and a cosurfactant are used. The high shear generates very small monomer droplets. The cosurfactant retards Ostwald ripening so that the small droplets can resist diffusional instability. The small droplets can then compete effectively for water-borne free radicals, and the locus of nucleation becomes predominantly the monomer droplets. Common cosurfactants include hexadecane, cetyl alcohol, and monomer-soluble polymer. In this invention, the water-insoluble alkyd acts as an in-situ cosurfactant. However, it may be desirable to add an additional cosurfactant as well.

Transport of large hydrophobic molecules such as alkyd resin can be a problem in conventional emulsion polymerization. Hence, an important feature of this invention is the use of a miniemulsion, rather than conventional emulsion polymerization process.

This invention comprises the miniemulsion polymerization of vinyl monomers in the presence of alkyd resin to form a hybrid latex which forms good films and can be used as a latex coating.

SUMMARY OF THE INVENTION

In accordance with one aspect of the present invention, there is provided a process for miniemulsion polymerization of a monomer or mixture thereof in the presence of an alkyd resin, which comprises dissolving one or more alkyd resins in an ethylenically unsaturated monomer or mixture thereof, thereby forming a solution, and combining this solution with water and at least one surfactant, and, under some conditions, a cosurfactant, and agitating the resulting mixture. The monomer or mixture thereof is substantially insoluble in water and the one or more alkyd resins are substantially insoluble in water but soluble in the monomer or mixture thereof;

The amount of the one or more alkyd resins is from about 1 percent to about 120 percent based on monomer weight; thereby obtaining an essentially stable aqueous monomer emulsion comprising an aqueous continuous phase and an organic disperse phase. The disperse phase comprises a monomer or mixture thereof and one or more alkyd resins, and is in the form of droplets having an average droplet diameter in the range from about 10 to about 1,000 nanometers.

A cosurfactant, including, but not limited to, hexadecane, cetyl alcohol, or polymer soluble in said monomer or mixture thereof, may be added to the monomer/alkyd solution in the amount of 1 to 5 percent by weight based on monomer to impart diffusional stability to the emulsion.

The emulsion is subjected to high rates of shear in a sonicator, homogenizer, colloid mill or other device capable of imparting rates of shear great enough to reduce the diameters of the droplets of the disperse phase to the range listed above.

This invention according to a still further aspect provides a latex or polymer emulsion which is the product obtained by polymerizing the monomer emulsion by a free radical mechanism under conditions of miniemulsion polymerization. The polymer content is in the form of particles having an average particle diameter in the range from about 10 to about 1,000 nanometers.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
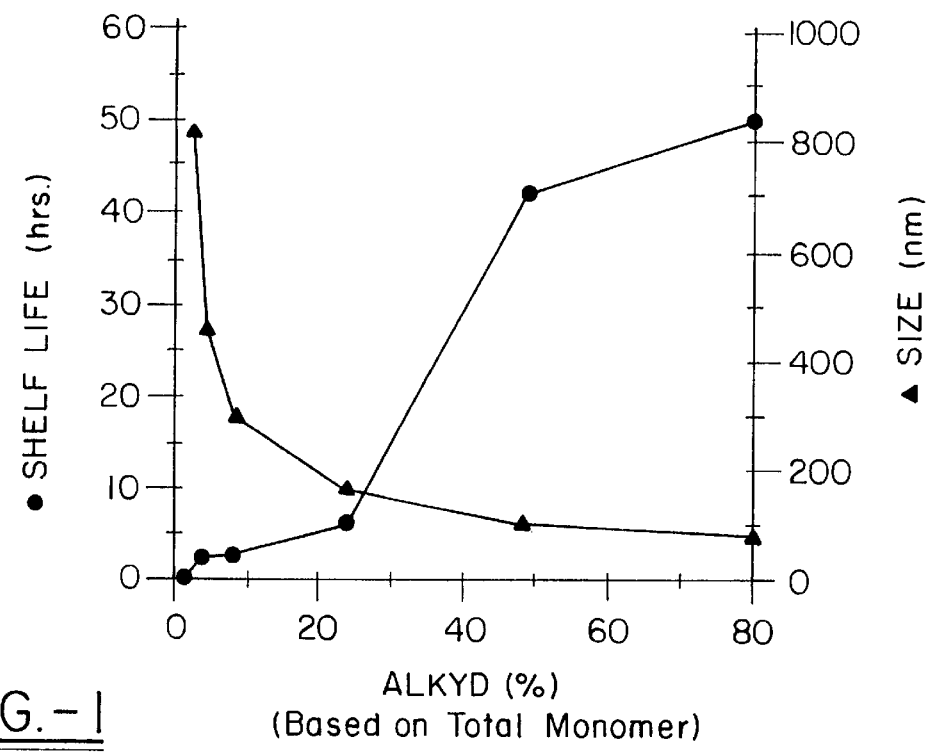
FIG. 1 is a plot of monomer emulsion shelf life and droplet size without PMMA.

The best mode for carrying out the invention will now be described for the purposes of illustrating the best mode known to the applicant at the time. The examples are illustrative only and not meant to limit the invention, as measured by the scope and spirit of the claims.

The term "latex" herein denotes a polymer emulsion. The terms "latex" and "polymer emulsion" will be used interchangeably in this specification. The product of the polymerization process of this invention is a latex.

The term "miniemulsion" herein denotes a monomer emulsion in which the average monomer droplet size is not in excess of about 1,000 nanometers (1 micron). This term is used to distinguish monomer emulsions and emulsion polymerization processes herein from conventional emulsion polymerization processes and starting monomer emulsions. Conventional starting monomer emulsions will be called "macroemulsions" herein.

The term "molecular weight" has its usual meaning to denote grams per gram mole of a substance. As applied to polymers herein, "molecular weight" in the absence of further qualification denotes number average molecular weight unless otherwise stated.

The terms "parts" and "percent" (or %) denote parts by weight and percentage by weight, respectively, unless otherwise stated.

The monomer emulsions of this invention are compositions in which water constitutes the continuous phase and a monomer or mixture thereof containing dissolved alkyd resin constitutes the disperse phase. Emulsions of this invention are the oil-in-water type. The disperse or organic phase constitutes from about 10 to about 50 percent of total emulsion weight, and conversely the continuous or aqueous phase constitutes about 50 to about 90 percent of total emulsion weight. The disperse phase, consisting essentially of monomer(s) and dissolved alkyd resin, is present as droplets having an average droplet diameter from about 10 to about 1,000 nanometers, preferably from about 80 to about 500 nanometers.

The monomeric starting material is a monomer or mixture thereof, i.e., one or more monomers. The monomer or monomers are addition polymerizable ethylenically unsaturated organic compounds which are essentially insoluble in water, i.e., which have water solubilities ranging from essentially zero to about 5 weight percent, preferably from essentially zero to about 3 weight percent. Solubilities are measured in pure water and denote grams of dissolved monomer per 100 grams of water. Representative monomers which can be polymerized either alone or in monomer mixtures according to this invention include: methyl methacrylate (MMA), styrene, vinyl acetate, methyl acrylate, butyl acrylate, acrylic acid, methacrylic acid, ethyl acrylate, butadiene and vinyl chloride. This list is representative and is not exhaustive.

The alkyd resins useable in this invention are any of the alkyds normally used in alkyd coatings formulations. Long to medium oils are preferred. Alkyd resins are the thermosetting reaction product of a dihydric or polyhydric alcohol (e.g., ethylene glycol or glycerol) and a mono/polybasic acid (e.g., phthalic anhydride) in the presence of a drying oil (e.g., linseed, soybean) which acts as a modifier. Alkyd resins may be produced for example, by direct fusion of glycerol, phthalic anhydride and drying oil at from 210° C. to 232° C. Solvents are then added to adjust the solids content. The amount of drying oil added varies depending upon the intended use. A representative non-exhaustive list of unsaturated dibasic carboxylic acids and anhydrides useful in this invention include, but are not limited to, maleic anhydride, fumaric acid, itaconic acid, phthalic acid and phthalic anhydride. Examples of monobasic acids would include unsaturated fatty acids and esters, non-limiting examples of which would include oleic, linoleic and linolenic acids, methyl esters thereof, and their glycerides. Drying oils would include those such as safflower, linseed, sunflower, soy, tung, orticica, fish oils, tall oil fatty acids and the like. The partial esters of these fatty acid components can be made with a polyalcohol such as glycerol, glycol (e.g., ethylene glycol, propylene glycol), trimethylolethane, trimethylolpropane, 1,3-butanediol, 1,6-hexanediol, pentaerythritol, or sorbitol or mixtures of such alcohols can be employed.

Polymeric cosurfactants may be used, but are not required for the invention. The polymeric cosurfactant is a polymer which is both highly water insoluble and highly soluble in the monomer of choice. The polymeric cosurfactant may be a polymer (e.g., homopolymer, copolymer, or block or graft copolymer) or a mixture or blend thereof having a molecular weight in the range of about 3,000 to about 1,100,000, preferably from about 9,000 to about 750,000. Especially preferred cosurfactants are those having a molecular weight in the range of about 350,000 to about 750,000. Representative polymeric cosurfactants useable in the present invention include polymethyl methacrylate (PMMA), polystyrene, polyvinyl acetate, polymethylacrylate and polyethylacrylate. Certain copolymers such as styrene-isoprene copolymer, and certain block polymers such as poly (styrene-block-butadiene) and poly (styrene-block-isoprene) are also useful. Other polymeric cosurfactants may be used as long as they meet the above criteria of being essentially insoluble in water but soluble in the monomer or monomer mixture, and are innocuous in the final product. A polymer cosurfactant which is a polymer of the monomer undergoing polymerization is preferred. Thus, polymethyl methacrylate is a preferred cosurfactant when methyl-methacrylate is the monomer. However, one may choose, as polymeric cosurfactant, a polymer which is not the polymer obtained by polymerization of the monomer of choice.

The amount of polymeric cosurfactant may be from about 0.5 to about 5.0 percent by weight based on monomer plus polymer. Preferably the amount of polymeric cosurfactant is from about 0.5 to about 2.0 percent by weight based on monomer plus polymer.

The polymeric cosurfactant dissolves in the monomer or monomer mixture to form the disperse (or organic) phase of the monomer emulsion. The resulting solution (the disperse phase) is an essentially homogeneous solution of monomer and polymer.

Nonpolymeric cosurfactants may be used in place of polymeric cosurfactants, or in combination with them. Representative nonpolymeric cosurfactants include hexadecane, cetyl alcohol, highly water-insoluble monomers such as 2-ethyl hexyl methacrylate, iso-octylacrylate and isodecyl acrylate, and chain transfer agents such as dodecyl mercaptan.

No cosurfactant is required in this invention since, under some conditions, the alkyd resin itself may act as a cosurfactant to stabilize the monomer droplets against diffusional degradation.

Conventional surfactants for emulsion polymerization may be used. Either a single surfactant or a mixture of surfactants may be used. Representative surfactants include: sodium lauryl sulfate and other alkyl sulfates; sodium dodecyl benzene sulfonate and other alkyl and aryl sulfonates; sodium stearate and other fatty acid salts; and polyvinyl alcohol and other non-ionic surfactants. The surfactant may be either an anionic, cationic or a non-ionic surfactant. When a mixture or combination of surfactants is used, the mixture may include an anionic or a cationic surfactant, plus a non-ionic surfactant, or two or more anionic or cationic surfactants, or two or more non-ionic surfactants. The amount of surfactant is from about 0.5 to about 5.0 percent by weight, based on monomer plus alkyd resin. The preferred amount is from about 0.5 to about 1.5 percent by weight, based on monomer plus alkyd resin.

Use of a cosurfactant, possibly including the alkyd resin itself, in accordance with this invention results in improved monomer emulsion stability. This is accomplished by a reduction in monomer droplet diameter, which in turn is attributable to the fact that the cosurfactant prevents or reduces the rate of Ostwald ripening. Ostwald ripening is the transfer of monomer from small droplets to large droplets to reduce the total surface energy of the system, resulting in an increase of the average droplet diameter in an emulsion. The other cause of growth in monomer droplet size is coalescence, which is inhibited by the surfactant or mixture thereof. By inhibiting diffusion of monomer from small droplets to large droplets, a cosurfactant slows down the emulsion breakdown process. In a macroemulsion, a monomer emulsion for a conventional emulsion polymerization in which no cosurfactant is used, disappearance of the small monomer droplets takes place in seconds, before nucleation can take place. When a cosurfactant according to this invention is used, Ostwald ripening is retarded so that nucleation of the monomer droplets takes place. In fact, it is possible to completely polymerize a miniemulsion of this invention prior to the onset of significant ripening.

Monomer emulsions according to the present invention are prepared as follows. The desired amount of cosurfactant (if used), and the desired amount of alkyd resin are added to the monomer or mixture thereof, then mixed with gentle agitation (e.g.,with a stirring bar) at room temperature until a homogenous solution is obtained. While the temperature in this step is not critical (in general, any temperature between the freezing point and the boiling point of the monomer can be used), preferred temperatures for monomer miniemulsion formation are from about 20° to about 50° C., especially from about 25° to about 40° C.

The solution prepared in the previous step is added to a previously formed solution of surfactant(s) in water. The entire contents are then subjected to high shear in order to form a miniemulsion. Suitable high shear mixing is obtained, for example, by sonication with a Fisher 300 Watt Sonic dismembrator for 5 minutes at 60 percent output (180 watts) with bulk mixing provided by a stirring bar. (The Fisher 300 Watt Sonic dismembrator is manufactured and distributed by Fisher Scientific Company, Pittsburgh, Penn. Fisher Scientific Company is a subsidiary of Allied-Signal, Inc., Morristown, N.J.) Other high shear mixing equipment, e.g.; a colloid mill or homogenizer can be used if desired. (The sonic dismembrator herein described is suitable for laboratory scale. A colloid mill or homogenizer are suitable for production scale.) In general, any equipment capable of producing localized high shear along with moderate bulk mixing can be used.

While it is preferable to premix the surfactant (or surfactants) and water so as to form an aqueous surfactant solution before adding the solution of polymer in monomer, it is possible to charge the alkyd/monomer solution, water and surfactant separately to a vessel which is equipped with an agitator or mixer capable of emulsifying the contents.

The above steps result in the formation of an essentially stable monomer emulsion which comprises an aqueous continuous phase comprising water and at least one surfactant dissolved therein, and an organic disperse phase which contains the monomer content and the alkyd resin content of the emulsion, i.e., an ethylenically unsaturated monomer or mixture thereof and one or more alkyd resins dissolved therein. A cosurfactant may or may not be present. The disperse phase is an essentially homogenous mixture of one or more monomers and one or more alkyd resins. The disperse phase is in the form of droplets having an average droplet diameter from about 10 nanometers to about 1,000 nanometers, preferably from about 80 to about 300 nanometers.

The aqueous monomer miniemulsion is essentially stable. The emulsion slowly "creams", i.e., the disperse phase slowly rises to the top so that a visible phase separation line appears. However, the shelf life of a miniemulsion of this invention will vary from about 60 minutes to about three months, depending on the amount of surfactant and the amount of cosurfactant used. In any case, the shelf life is sufficiently long so that the monomer content of the emulsion can be polymerized in less time than the time required for phase separation or "creaming". (The term "creaming" and variants thereof such as "cream" and "creams" refer to phase separation which takes place in unhomogenized milk, wherein butterfat globules slowly rise to the top of the container. Creaming in milk is readily observable when the milk with a cream is contained in a glass bottle or other transparent container.)

The monomer content of the monomer emulsion is polymerized under free radical polymerization conditions in the presence of a free radical initiator. Both the initiator and the conditions may be conventional. Free radical polymerization conditions are generally obtained by adding a free radical initiator and allowing polymerization to take place. Suitable free radical initiators are known in the art. These include, for example, the organic peroxides such as benzoyl peroxide, lauroyl peroxide and dicumyl peroxide; and inorganic persulfates such as potassium persulfate or ammonium persulfate; azobis-(isobutyro nitrile) (AIBN); and redox pairs such as $Fe^{2+}/H_2O_2$; $ROH/Ce^{4+}$ (where R is an organic group such as C1–C6 alkyl or C5–C8 aryl); and $K_2S_2O_8/Fe^{2+}$. The initiators used in the present invention in general are known in the art. Basically, any free radical generating system which is effective at the polymerization temperature can be used. The type of initiator is not critical to this invention. The polymerization initiator may be either a water soluble or an oil soluble compound.

Polymerization may be carried out over a broad temperature range, e.g., from about 20° to about 70° C. The preferred polymerization temperature depends on the choice of initiator. A preferred polymerization temperature range is from about 25° to about 50° C. The polymer particle size in the product polymer emulsion or latex is in the range of about 10 to about 1,000 nanometers, which is the same range as that of the monomer droplets in the monomer emulsion. There is no substantial change in particle size during polymerization in most cases. Usually the product polymer particle size will be in the range from about 10 to about 1,000 nanometers. The preferred product polymer particle size range is from about 80 to about 300 nanometers.

Polymer latexes produced according to the present invention can be used to formulate water-borne coatings such as latex paint. The coatings will have the environmental (lack of volatile organic emissions) and convenience (water cleanup) advantages of latex coatings, but with the hardness and durability properties of alkyd coatings which are normally applied from an oil vehicle.

This invention will now be described in further detail with reference to the example which follows.

In the following example, the word "emulsion" is taken to mean emulsions (with or without polymer cosurfactant) which have been created and evaluated for stability. The word "latex" is used to connote emulsions in which the monomer has been polymerized to form polymeric latexes. The "polydispersity" of the droplet or particle size distribution will be defined as the ratio of the number average diameter to weight average diameter.

EXAMPLE #1

Alkyd/polymer miniemulsion latexes were prepared using the following reagents: Alkyd resin was supplied by McWhorter Technologies as brand Durama 2768 which contains 80% durable medium Soya-linseed alkyd and 20% solvents, i.e., 6.3% n-butyl acetate, 4.4% xylene, 2.9% solvent naphtha (petroleum), 5.2% trimethylbenzene, and 0.9% ethylbenzene. The solvents were removed by vacuum distillation before use. Methyl methacrylate (MMA), butyl acrylate (BA), acrylic acid (M), potassium persulfate (all from Aldrich), polymethyl methacrylate (PMMA) (molecular weight=100,000, Polyscience), sodium lauryl sulfate (SLS) (Fisher), and benzoyl peroxide (BPO) (Fisher) were used as supplied. The water was deionized.

Miniemulsion and macroemulsion polymers were produced from the recipes shown in Table 1.

TABLE 1

Recipe for Emulsion and Miniemulsion Polymerizations[1]

| Sample code | Ingredients (wt %) | | | | |
|---|---|---|---|---|---|
| | MMA | PMMA | BA | AA | Alkyd[2] |
| EA[3]00 | 49 | 0 | 50 | 1 | 0 |
| EA[3]05 | 49 | 0 | 50 | 1 | 5 |
| EA[3]100 | 49 | 0 | 50 | 1 | 100 |
| MA[4]00 | 45 | 4 | 50 | 1 | 0 |
| MA[4]30 | 45 | 4 | 50 | 1 | 30 |
| MA[4]60 | 45 | 4 | 50 | 1 | 60 |
| MA[4]100 | 45 | 4 | 50 | 1 | 100 |

[1]The continuous phase consists of 250 parts water per 100 parts total monomer, 0.02 mmol/L water sodium lauryl sulfate, and 0.02 mmol/L water potassium persulfate.
[2]The alkyd resin percentage is based on the total monomer weight.
[3]EA are emulsion polymerizations.
[4]MA are miniemulsion polymerizations.

The miniemulsions were prepared by dispersing the desired amount of monomer-PMMA-alkyd solution (some additional runs contained 0.5 wt % BPO) in the aqueous SLS solution by mixing with a rotating stirrer at room temperature. The resulting emulsion was sheared further by sonication with a Heat Systems 474 W Sonicator Ultrasonic Processor XL for 10 minutes at 21% output (100 W). The beaker containing the emulsion was immersed in cool water during sonication to maintain constant temperature.

The monomer miniemulsion was transferred to a 1000 mL four-neck flask which was equipped with nitrogen inlet-outlet tube, condenser, and mechanical stirrer. The system was purged with nitrogen for 20 minutes and heated to 60 or 80° C. Agitation was provided by a paddle stirrer at 500 rpm. The polymerization was started by injection of 20 mL sodium persulfate solution. When BPO was present in the monomer mixture the polymerization started during the heating period. The reaction was followed by gravimetric conversion analysis. Samples were removed by a syringe at different times and injected in a weighing dish containing a 0.5% hydroquinone solution. The samples were dried in an oven at 70° C. for 24 hours. The emulsion polymerizations were carried out in the same manner except that no sonication pre-emulsification process was used and the PMMA cosurfactant was not employed.

Monomer droplet and particle sizes were measured by quasi-elastic light scattering with a Malvern Autosizer lic. The measurement process for monomer droplets involved dilution of the emulsion with a monomer saturated solution of 0.1% SLS to about 50:1. Then 2 mL of this diluted emulsion were put into a quartz curette and the droplet diameter, distribution and standard divisions were recorded in five minutes. The latex particle size was measured in the same way but the dilution was with 0.1% SLS solution to 100:1.

Emulsion and latex shelf-life were measured by placing approximately 30 mL of sample in a capped glass vial and observing the time necessary for a visible creaming line to appear. Two drops of a water-soluble red pigment solution was added to each sample to increase the contrast between phases.

The double bond content in alkyd-monomer mixtures and in the alkyd latex were measured by $^{13}$C-NMR. The copolymer spectra of $^{13}$C-NMR were obtained with a Varian XL-400 spectrometer operating at 100 MHZ. The measurement conditions were: sample concentration 0.1 g/mL, spectral width 20000 Hz, acquisition time 0.4 s, flip angle 45°, pulse delay 1.6 s, and number of scans 512. Chloroform was used as an internal standard for all NMR spectra.

Monomer miniemulsions with PMMA as cosurfactant, were prepared with different amounts of alkyd resin. The monomer droplet shelf lives, the droplet sizes and polydispersities are shown in Table 2.

TABLE 2

Monomer emulsion shelf lives and droplet size characteristics

| Sample code | Shelf Life | Size (nm) | Polydispersity Index |
|---|---|---|---|
| MA00 | 7 hours | 307 | 1.054 |
| MA30 | >10 days | 91.3 | 1.016 |
| MA60 | >10 days | 175.6 | 1.017 |
| MA100 | >50 days | 260.5 | 1.004 |
| EA00 | 2 min | not tested | not tested |
| EA100 | 8 min | not tested | not tested |

The PMMA cosurfactant is effective in the preparation of kinetically stable miniemulsions (first four rows of Table 2). Table 2 also shows that the alkyd-acrylate miniemulsions are much more stable than normal emulsions prepared without PMMA (last two rows of Table 2). Their shelf life varies from 7 hours to more than 50 days. The size of monomer droplets is below 300 nm. Based on the shelf life and droplet size data, it seems likely that these emulsions are somewhere between kinetically stable systems (shelf life of a few hours) and truly stable miniemulsions (shelf life of a few months). PMMA alone has been shown to form kinetically stable emulsions. The presence of water-insoluble alkyd, in addition to the PMMA is evidently stabilizing the droplets against Ostwald ripening, forming emulsions which border on being true miniemulsions. Table 2 additionally shows that the monomer droplet size increases as the alkyd resin content is increased. The droplet sizes are smaller, however, than the droplets in the miniemulsions that do not contain alkyd.

Shelf life samples indicate that after ten days, the normal emulsion with alkyd had separated into three phases, monomer on the top, clear water in the middle, and alkyd resin on the bottom. The miniemulsion without alkyd showed two phases, monomer and water. All miniemulsions with alkyd resin remained uniform.

Alkyd resin is highly hydrophobic and hence not very soluble in the aqueous phase. Monomer droplet instability in emulsion systems can be caused by diffusion of monomer from one droplet to another. The high hydrophobicity of the alkyd decreases the diffusion rate of monomer from the monomer droplets to water, which resulted in long shelf life for these emulsions. Droplets containing alkyd and/or PMMA are somewhat like the monomer-saturated polymer particles in conventional emulsion polymerization. Hence these droplets should be more stable. This is confirmed by the shelf life and size of the monomer droplets in systems without PMMA (Table 3 and FIG. 1)

TABLE 3

Monomer Droplet Shelf Life, Size & Distribution without PMMA

| Percent of alkyd (%)[1] | Shelf Life | Size (nm) | Polydispersity Index |
|---|---|---|---|
| 1.6 | 35 min | 816.5 | 1.005 |
| 4.0 | 131 min | 459.3 | 1.008 |
| 8.0 | 160 min | 301.9 | 1.008 |
| 24 | 6 hrs | 163.3 | 1.009 |
| 48 | >42 hrs | 100.3 | 1.013 |
| 80 | >42 hrs | 79.6 | 1.010 |

[1]Based on the total monomer amount

When no PMMA was present, the alkyd-acrylate droplets became small. The shelf life also became longer as the alkyd content increased. Very stable miniemulsions can be obtained when the alkyd content is higher than 30%. Comparing Table 2 (first four rows with PMMA added) with Table 3 (no PMMA added for any entry), shows that PMMA plays an important role in producing stable miniemulsions. The shelf life was increased by PMMA additions (7 hours to >50 days) even though a stable miniemulsion could be obtained at high alkyd content without PMMA (35 minutes to >42 hours). By contrast, the shelf life of normal emulsions was very short, only 2 to 8 minutes.

Figure 2:
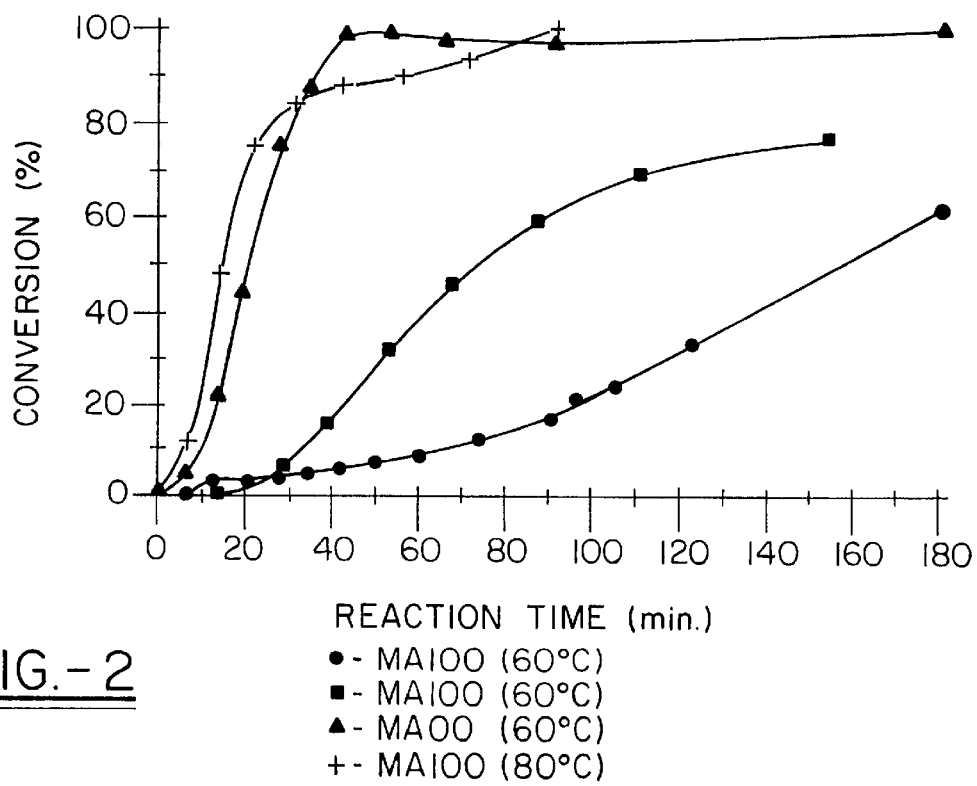
FIG. 2 is a plot of Conversion vs. Time for miniemulsion polymerizations.

The miniemulsion with and without alkyd resin and with different emulsifier and initiator concentrations were polymerized at 60 and 80° C. and shown in FIG. 2 for the experimental conditions shown in Table 4.

TABLE 4

| System | T (° C.) | SLS mol/L water | $K_2S_2O_8$ mol/L water | BPO % monomer |
|---|---|---|---|---|
| MA100 | 60 | 0.01 | 0.01 | 0 |
| MA100 | 60 | 0.02 | 0.02 | 0 |
| MA00 | 60 | 0.01 | 0.01 | 0 |
| MA100 | 80 | 0.02 | 0.02 | 0.5 |

Figure 3:
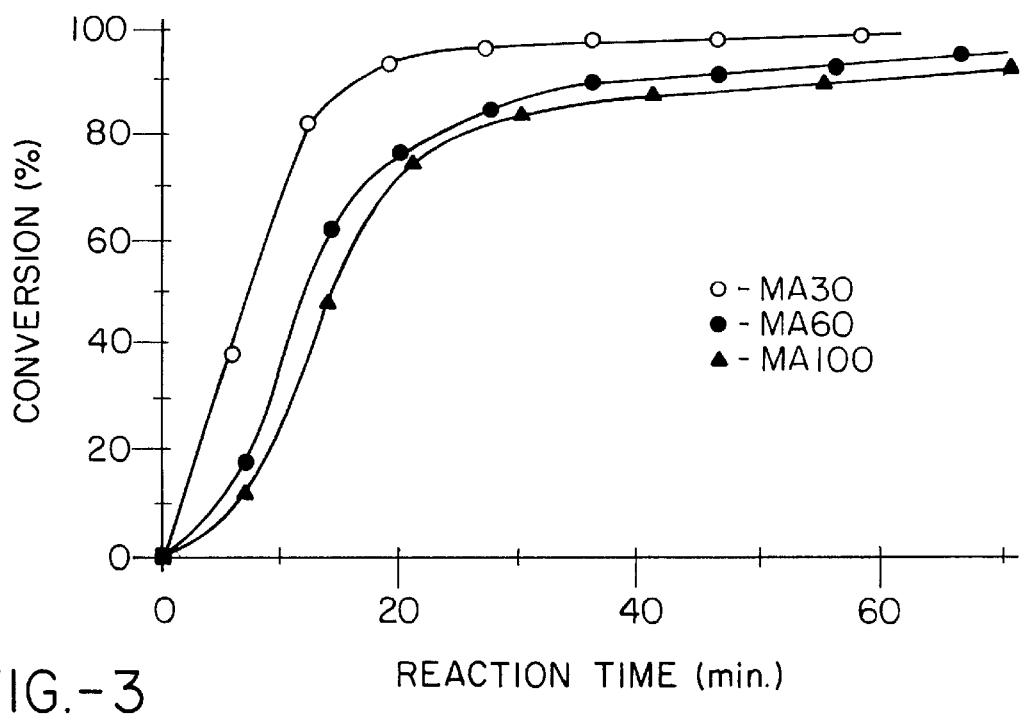
FIG. 3 is a plot of conversion profiles for miniemulsion polymerizations with different amounts of alkyd at 80° C.

The polymerization rate with alkyd was slower than that without alkyd. Doubling the initiator and emulsifier concentration increased the reaction rate, but not to the level achieved with the miniemulsion polymerization without alkyd. Similar reaction rates for miniemulsions with alkyd were observed if the reaction temperature was raised from 60 to 80° C. and organic initiator, BPO, was added in addition to doubling the amount of the water-soluble initiator, potassium persulfate, and the emulsifier (SLS). The retarding influence of alkyd was also evident with the miniemulsion polymerizations with different amounts of alkyd (FIG. 3).

The low reaction rates in the presence of alkyd may be caused by a retarding impurity in the alkyd or by resin chain transfer that produces an inactive radical. The mixed initiator (water and oil soluble initiators) was used to circumvent this problem.

Figure 4:
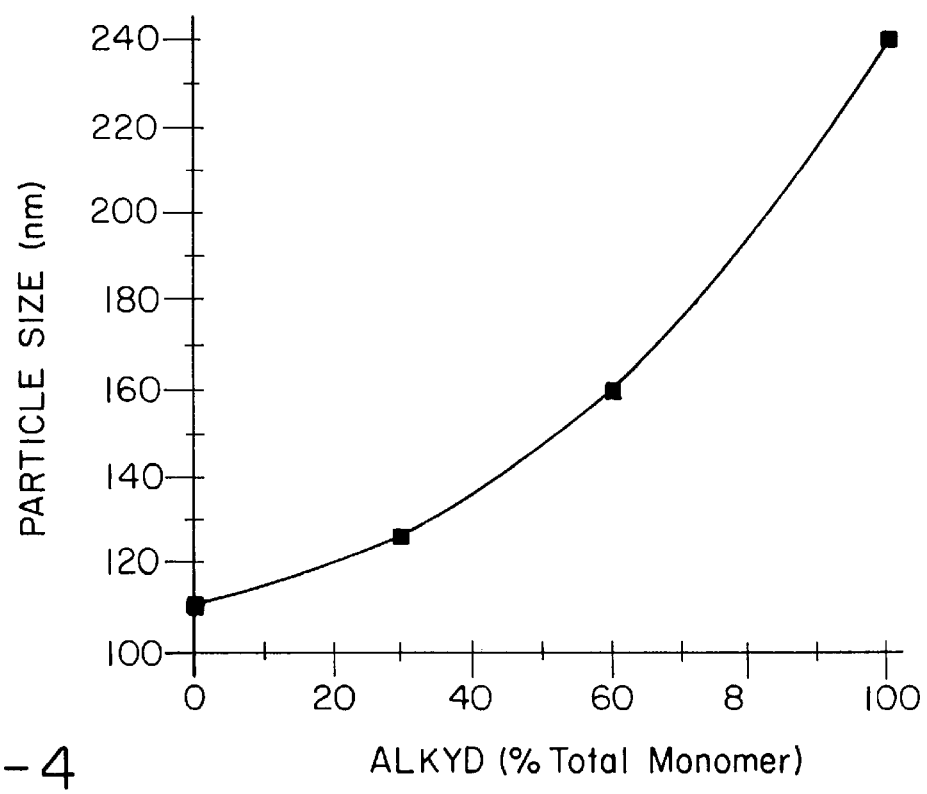
FIG. 4 is a plot of Particle Size vs. Alkyd Amount for miniemulsion polymerizations.

The latexes obtained from the miniemulsion polymerization of the alkyd-acrylate mixtures, were uniform emulsions, and no coagulation occurred during polymerization with the recipes listed in Table 1. Table 5 and FIG. 4 show the polymer particle sizes and polydispersities.

TABLE 5

Particle Size & Distribution

| Sample code | Polymer diameter (nm) | Polydispersity Index |
|---|---|---|
| MA00 | 110.7 | 1.005 |
| MA30 | 126.2 | 1.032 |
| MA60 | 159.9 | 1.028 |
| MA100 | 241.6 | 1.017 |
| EA00 | 70.3 | 1.002 |
| EA05 | separated | |
| EA100 | separated | |

The polymer particle sizes increased and polydispersity decreased as the alkyd content was increased. The particle sizes of the alkyd-acrylate polymer were larger than particles formed by miniemulsion or macroemulsion polymerization without alkyd, and the polydispersities were also larger. No acceptable latex products with alkyd were made via macroemulsion polymerization. The alkyd separated from the polymerization system and formed a separate layer.

Figure 5:
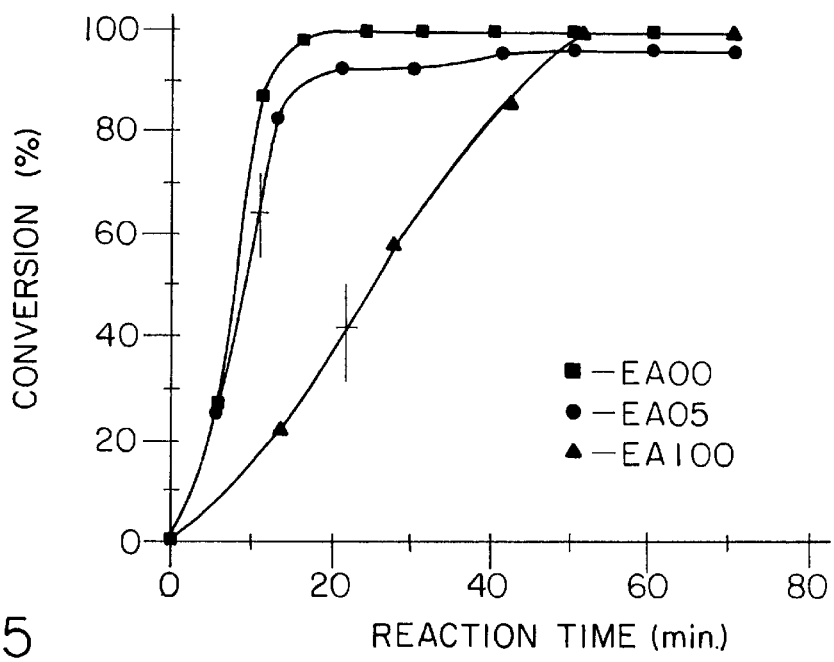
FIG. 5 is a plot of Conversion vs. Reaction Time in macroemulsion polymerization with alkyd.

Conversion profiles for emulsion polymerizations with and without alkyd are shown in FIG. 5. The results are similar in one respect with miniemulsions: the addition of alkyd decreases the reaction rate. However, it was not possible to obtain good latex products via normal emulsion polymerization with alkyd. The alkyd separated from the polymerization system as indicated in FIG. 5.

The initial number of monomer droplets and the final number of polymer particles were the same for the alkyd-acrylate miniemulsion polymerizations. (See Tables 2 and 5.) Hence, it would appear that nearly all droplets became particles. Mass transfer from monomer droplets to micelles or monomer-saturated particles is not required in miniemulsion polymerization as it is in macroemulsion polymerization. The alkyd can stay in the same place, i.e., in the initial monomer droplets which become the final polymer particles. In contrast, particle nucleation in macroemulsion polymerizations takes place in micelles or in the aqueous phase. Monomer must then diffuse out of the monomer droplets, across the aqueous phase, and into the growing particles. In the alkyd-acrylate system, the acrylate monomer can move from the monomer droplets to the micelles or polymer particles, but alkyd is mass transfer limited. Therefore, as the monomer in alkyd-acrylate droplets migrates out of the droplets, the remaining alkyd-acrylate droplets become unstable and agglomeration occurs. This was observed in the macroemulsion polymerizations as alkyd separation as reported above. This problem was not encountered in the miniemulsion polymerization, since the site of polymerization is the monomer droplets containing the alkyd resin.

The alkyd used in the experimental work presented was made from linseed and soya fatty acid and polyols. The main fatty acids in linseed oil are: 52% linolenic (cis-9, cis-12, cis-15-octadecatrienoic), 22% oleic (cis-9-octadecenoic), 16% linoleic (cis-9, cis-12 octadecadienoic), and small amounts of other acids; in Soya oil are: 51% lanolin, 25% oleic, and other acids. The double bonds in the alkyd can react with free radicals, but the double bond structure leads to different reactivities from the vinyl bond in acrylate monomers.

The alkyd-acrylate polymers and blends of pure alkyd and pure MMA-BA-AA copolymer were analyzed by $^{13}$C-NMR. The results are shown in Table 6.

TABLE 6

$^{13}$C-NMR results for Alkyd-Latex and Alkyd-Polyacrylate Blends

| Sample code | Peak Area at 175 | Peak Area at 167 | Peak Area at 130 | Ratio of $S_{130}/S_{175}$ | Conversion of Double Bonds |
|---|---|---|---|---|---|
| Alkyd | 3.6 | 13.3 | 110 | 30.556 | 0 |
| Blend30[1] | 19.1 | 2.9 | 21.5 | 1.1257 | 0 |
| Blend60[1] | 15.9 | 4.8 | 41.1 | 2.5849 | 0 |
| Blend100[1] | 16.9 | 7.4 | 65.3 | 3.8639 | 0 |
| MA30 | 19.2 | 2.3 | 19.7 | 1.0266 | 21.37 |
| MA60 | 15.7 | 3.5 | 27.8 | 1.7707 | 31.50 |
| MA100 | 14.5 | 4.1 | 40.9 | 2.8207 | 27.17 |

[1]Alkyd percent based on polyacrylate

The $^{13}$C-NMR spectra of both the alkyd-acrylate copolymer and the alkyd-polyacrylate blend (FIG. 6) have some chemical shifts at lower than 100 ppm, but the interesting chemical shifts are around 176 ppm, the multipeak resonance by carbon in ester groups of polyacrylate and alkyd, and around 130 ppm, the multipeak resonance by carbon in double bonds. Another peak at 165 ppm is caused by a special ester group in the alkyd.

Comparing the peak area at 130 ppm of alkyd-acrylate polymer with that of the corresponding alkyd-polyacrylate blend, it can be seen that the peak area of copolymer is smaller than that of the blend while the peak area at 176 ppm is relatively unchanged. This indicates that some alkyd double bonds react and some remain. This can be quantified by comparing the ratio of the peak area at 130 ppm to the peak area at 175 ppm ($S_{130}/S_{175}$) in Table 6. The double bond conversion can be approximated with the following formula:

$$\% \text{ double bond conversion} = 100 * \left[ \frac{1 - \left(\frac{S_{130}}{S_{175}}\right)_{copolymer}}{\left(\frac{S_{130}}{S_{175}}\right)_{blend}} \right]$$

where $(S_{130}/S_{175})_{copolymer}$ is the ratio of resonance of alkyd-acrylate polymer at 130 and 175 ppm, and $(S_{130}/S_{175})_{blend}$ is the corresponding ratio of resonance of alkyd-polyacrylate blend. The results in Table 6 show that only 20 to 30% of the double bonds in the alkyd react. This confirms that the alkyd is copolymerized with the acrylates and that the final polymer product is an alkyd-acrylate copolymer not an alkyd-polyacrylate blend. Approximately 70 to 80% of the double bonds in the alkyd remained in the alkyd-acrylate latex after reaction, which could enhance curing as the latex is dried during application.

The results cited above indicate that the polyacrylate was grafted to the alkyd molecules. The grafting ratio was tested by extraction. Ethyl ether is a good solvent for alkyd and for some of the lightly grafted alkyd and a bad solvent for polyacrylate. The alkyd-acrylate products were extracted with ethyl ether, and the alkyd and most grafted alkyd were removed from the total polymer in a Soxhlet extractor. The polymer remaining consisted of acrylic polymer and very highly grafted alkyd. If the amount of highly grafted alkyd is neglected, (results in Table 8 indicate that this must comprise less that 5.24% of the total polymer) the grafting efficiency of alkyd can be calculated by the following formula:

$$\% \text{ grafting efficiency} = 100 * \left( \frac{\text{wt polyacrylate grafted onto alkyd}}{\text{wt total acrylate monomer}} \right)$$

The extraction data and calculated grafting efficiencies are shown in Table 7.

TABLE 7

Extraction with Ethyl Ether Solvent and Degree of Grafting

| Sample code | Solid % Left After Extraction | | Degree of Grafting (%) |
|---|---|---|---|
| | Based on all Solids | Based on Polyacrylate | |
| MA100 | 15.81 | 30.38 | ≧69.62 |
| MA60 | 30.70 | 49.29 | ≧50.71 |
| MA30 | 59.70 | 78.13 | ≧21.87 |
| MA00 | 96.20 | 96.89 | 0 |

Figure 7:
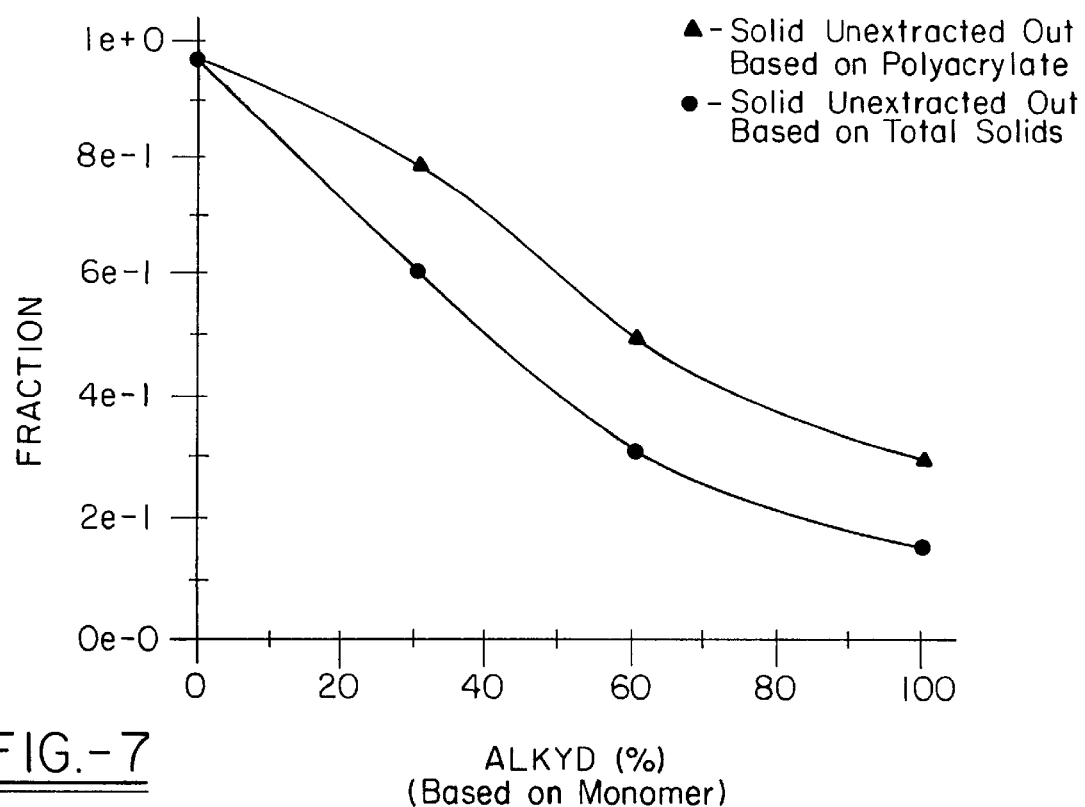
FIG. 7 is a plot of extraction data of alkyd-polyacrylate polymers with ethyl ether.
Figure 6A:
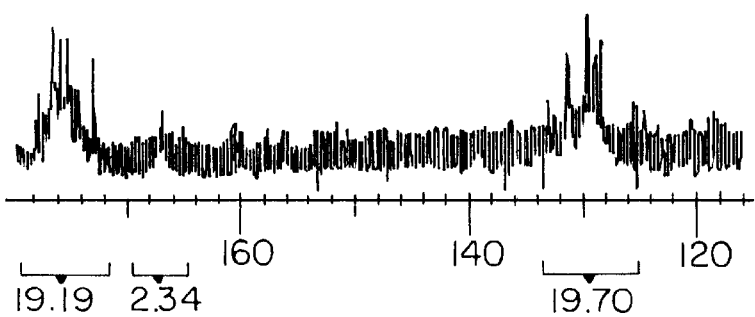
FIGS. 6a–6f are $^{13}$C-NMR for alkyd-acrylate copolymer and alkyd-polyacrylate blends (a) MA30; (b) MA60; (c) MA100; (d) Blend 30; (e) Blend 60; and (f) Blend 100.
Figure 6B:
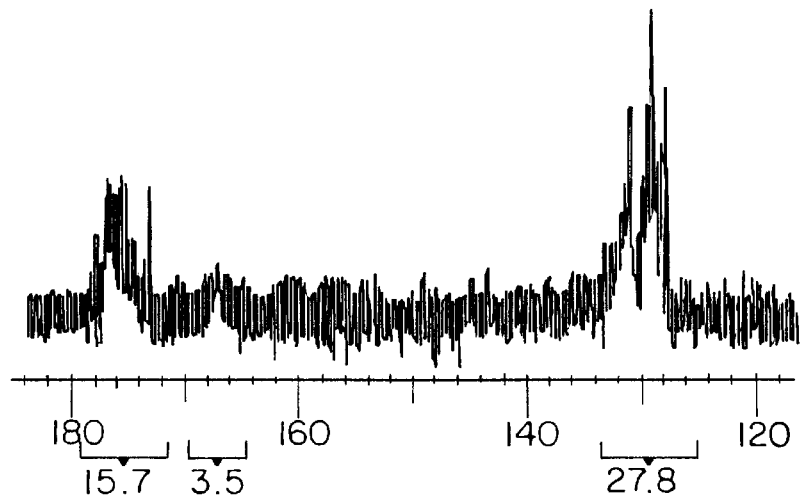
Figure 6C:
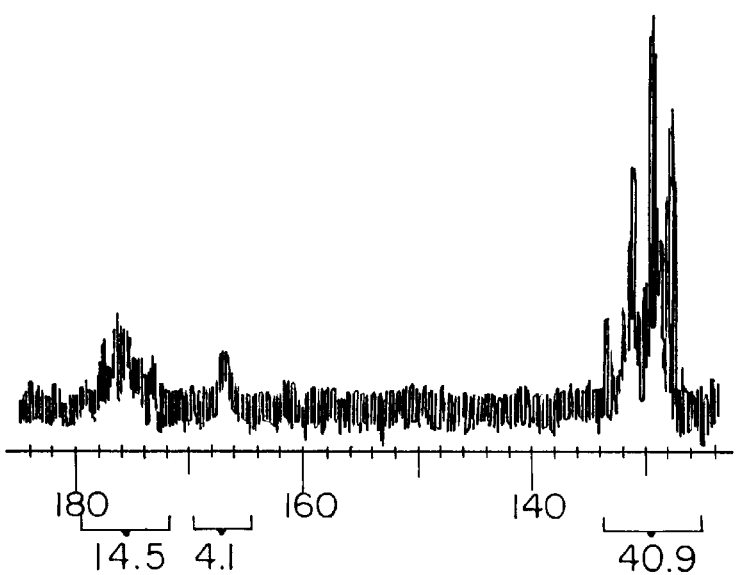
Figure 6D:
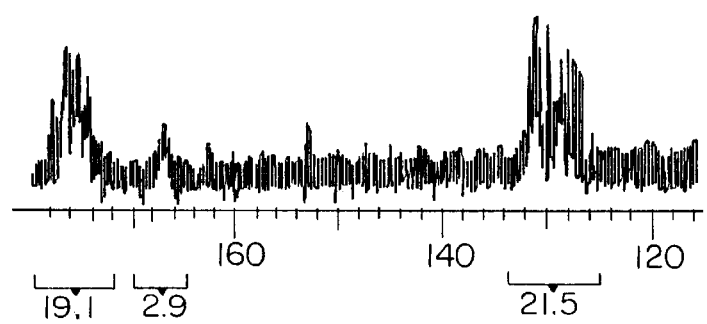
Figure 6E:
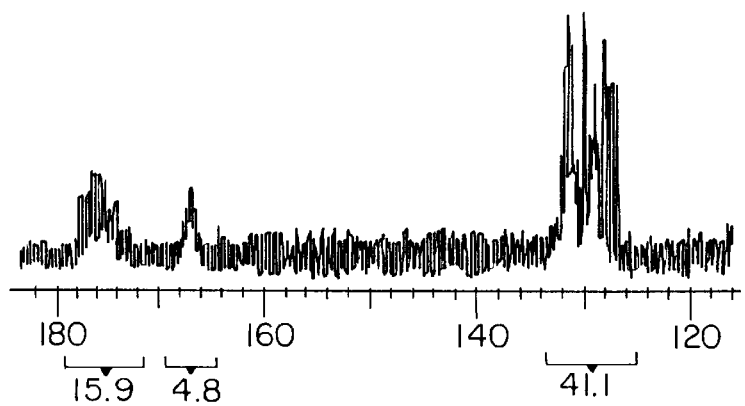
Figure 6F:
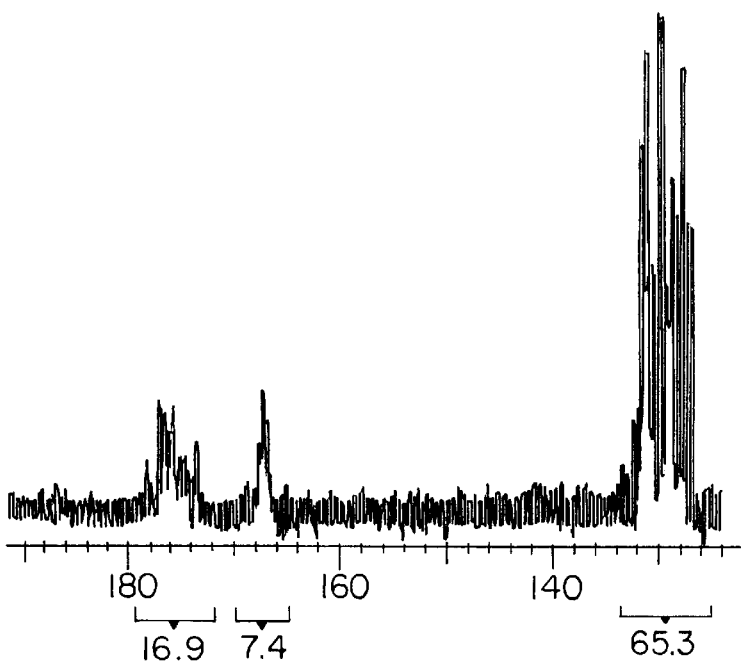

When more alkyd was added to the miniemulsion polymerization system, more polyacrylates were grafted onto the alkyd. Approximately 70% of the polyacrylate was grafted onto alkyd in Run MA100 which contained equal amounts of monomers and alkyd (FIG. 7).

The alkyd is a multifunctional resin which contains at least two double bonds per molecule. Hence, there is a possibility that the alkyd-acrylate copolymer is crosslinked by the multifunctional molecule even though most of the double bonds are not reacted (Table 6). This was investigated by extracting the alkyd-acrylate copolymer with different good solvents. The results are shown in Table 8.

TABLE 8

Extraction with Chloroform-Toluene-THF-Methylene Chloride-Methyl Ethyl Ketone

| Sample code | Solid Weight | | Degree of Crosslinking (%) |
|---|---|---|---|
| | Before Extraction | After Extraction | |
| MA00 | 4.7144 | 0 | 0 |
| MA30 | 5.0884 | 0.1846 | ≦3.63 |
| MA60 | 5.0285 | 0.2636 | ≦5.24 |
| MA100 | 3.1256 | 0.0719 | ≦2.30 |

Five solvents were used in the extraction of the copolymer. The solvent was changed every 12 hours. Table 8 shows that there is less than 5.24% crosslinked or highly branched copolymer. The small amount of crosslinked or highly grafted polymer may play a important role in increasing material strength, but it should not affect the coating application.

In order to obtain preliminary information on potential application performance, films were formed from five products on wood and metal substrates. These films were made from latex product directly from the reactor with 1% (wt/wt latex) hydroxy ethyl cellulose as a thickener, using a Baker Coater draw-down, and dried at room temperature. No pigment or dying agents were added. The results are given in Table 9.

TABLE 9

Film Test Results

| Sample code | Hardness | Adhesion |
|---|---|---|
| MA00 | B | passed |
| MA30 | B | fair |
| MA60 | B | passed |
| MA100 | B | passed |
| EA00 | B | passed |

The films were less than 1 mil thick and best results are performed on films 1–3 mils in thickness. The films have good adhesion, acceptable hardness and poor coverage and uniformity on panels which could be improved with thickeners and pigments. ASTM Hardnesses were all "B" which is acceptable for common coatings. No alkyd drying agents were used.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. While this invention has been described in detail with reference to preferred embodiments, it shall be understood that such description is by way of illustration and not by way of limitation.

What is claimed is:

1. A process for preparing an aqueous monomer/alkyd emulsion which comprises:
    mixing at least one alkyd resin having at least two carbon-carbon double bonds, and optionally at least one cosurfactant, in at least one ethylenically unsaturated monomer or mixture thereof, thereby forming an alkyd-resin-in-monomer solution, and
    combining the alkyd-resin-in-monomer solution with water, and
    at least one surfactant, and
    agitating the resulting mixture under high shear;
    thereby obtaining an aqueous monomer emulsion comprising:
        an aqueous continuous phase; and
        an organic disperse phase;
    the organic disperse phase comprising:
        said at least one ethylenically unsaturated monomer or mixture thereof, said at least one alkyd resin and optionally said at least one cosurfactant, provided that said at least one cosurfactant is present when the amount of alkyd resin is less than 30 parts by weight based on 100 parts by weight of monomer; and
        said organic disperse phase being in the form of droplets having an average droplet diameter range from about 10 to about 1,000 nanometers.

2. The process of claim 1 wherein the step of mixing the at least one alkyd resin with at least one ethylenically unsatured monomer or mixture thereof further comprises adding at least one cosurfactant.

3. The process of claim 2 wherein the cosurfactant is a polymeric cosurfactant.

4. The process of claim 3 wherein the polymer is water insoluble yet soluble in the at least one ethylenically unsaturated monomer.

5. The process of claim 4 wherein the polymer is selected from the group consisting of homopolymers and copolymer.

6. The process of claim 5 wherein the copolymer is selected from the group consisting of random copolymers, block copolymers, statistical copolymers and graft copolymers.

7. The process of claim 3 wherein the number average molecular weight of the cosurfactant is from 3,000 to about 1,100,000.

8. The process of claim 7 wherein the number average molecular weight of the cosurfactant is from 9,000 to about 750,000.

9. The process of claim 8 wherein the number average molecular weight of the cosurfactant is from 350,000 to about 750,000.

10. The process of claim 3 wherein the cosurfactant is a polymer obtained by the polymerization of the at least one ethylenically unsaturated monomer.

11. The process of claim 3 wherein the amount of polymeric cosurfactant is from about 0.5 to 5.0 percent by weight based on the amount of the at least one ethylenically unsaturated monomer and polymeric cosurfactant added.

12. The process of claim 11 wherein the amount of polymeric cosurfactant is from about 0.5 to 2.0 percent by weight based on the amount of the at least one ethylenically unsaturated monomer and polymeric cosurfactant added.

13. The process of claim 1 wherein the organic disperse phase is from about 10 to about 50 percent by weight of the total emulsion weight.

14. The process of claim 1 wherein the at least one ethylenically unsaturated monomer or mixture thereof has a water solubility of from 0 to about 5 weight percent.

15. The process of claim 14 wherein the at least one ethylenically unsaturated monomer or mixture thereof has a water solubility of from 0 to about 3 weight percent.

16. The process of claim 1 wherein the at least one ethylenically unsaturated monomer or mixture thereof is selected from the group consisting of styrene, vinyl acetate, C1 through C4 inclusive alkyl acrylate, C1 through C4 inclusive alkyl methacrylate, acrylic acid, methacrylic acid, butadiene and vinyl chloride.

17. The process of claim 1 wherein the at least one surfactant is selected from the group consisting of anionic, cationic and non-ionic surfactants.

18. The process of claim 17 wherein the surfactant is added in an amount of from 0.5 to about 5.0 percent by weight based on the amount of the at least one ethylenically unsaturated monomer and alkyd resin added.

19. The process of claim 18 wherein the surfactant is added in an amount of from 0.5 to about 2.0 percent by weight based on the amount of the at least one ethylenically unsaturated monomer and alkyd resin added.

20. The process of claim 1 in which the amount of said one or more alkyd resins is from about 1 percent to about 120 percent by weight based on the amount of the at least one ethylenically unsaturated monomer.

21. A process according to claim 1 in which the weight of said disperse phase is from about 10 percent to about 60 weight percent based on total emulsion weight.

22. A process according to claim 1 wherein a temperature of the process is from about 20 to about 80° C.

23. The process of claim 22 wherein
the temperature is from about 25–70° C.

24. The process of claim 1 which further comprises adding a free radical initiator after the step of agitating the mixture under high shear.

25. The process of claim 2 wherein the cosurfactant is a cosurfactant selected from the group consisting of hexadecane, cetyl alcohol, water-insoluble monomers and chain transfer agents.

26. The process of claim 25 wherein the water-insoluble monomer is selected from the group consisting of 2-ethyl hexyl methacrylate, iso-octylacrylate and isodecyl acrylate and the chain transfer agent is dodecyl mercaptan.

27. A process which comprises:

forming an aqueous monomer/alkyd resin emulsion by combining water and at least one surfactant with a mixture comprising at least one ethylenically unsaturated monomer with at least one alkyd resin having at least two carbon-carbon double bonds and optionally at least one cosurfactant, provided that said at least one cosurfactant is present when the amount of said alkyd resin is less than 30 parts by weight based on by 100 parts by weight based on 100 parts by weight of monomer;

agitating the emulsion under high shear to form monomer particles having an average particle size in the range of about 10 to about 1,000 nanometers; and initiating the polymerization by adding a free radical initiator, thereby polymerizing the at least one ethylenically unsaturated monomer in the emulsion and forming a polymer emulsion in which the polymer content is in the form of particles having an average particle size in the range from about 10 to about 1,000 nanometers.

28. The process of claim 27 in which a polymerization temperature is from about 20° C. to about 70° C.

29. The process of claim 27 in which the monomer/alkyd resin emulsion forms a latex after the addition of the free radical initiator in which the alkyd resin is grafted onto the polymer formed from the polymerization of the at least one ethylenically unsaturated monomer.

30. The product of the process of claim 1.

31. The product of the process of claim 27.

32. The process of claim 1 wherein said cosurfactant is a water-immercible organic cosurfactant.

33. The process of claim 1 wherein said droplets have an average droplet diameter of about 80 to about 300 nanometers.

34. The process of claim 27 wherein said cosurfactant is a water-immiscible organic cosurfactant.

35. The process of claim 27, wherein said droplets have an average droplet diameter range from about 80 to about 300 nanometers.

36. The process of claim 27, wherein said at least one ethylenically unsaturated monomer, said at least one alkyd resin and said at least one cosurfactant when present are combined to form an alkyd-resin-in-water solution.

* * * * *